United States Patent
Brooks et al.

(10) Patent No.: US 11,445,327 B2
(45) Date of Patent: Sep. 13, 2022

(54) MOBILE DEVICE INTELLIGENT PROCESSING AND PRESENTATION OF WIRELESS EMERGENCY ALERTS

(71) Applicant: T-Mobile USA, Inc., Bellevue, WA (US)

(72) Inventors: Terri L. Brooks, Prosper, TX (US); Precia Carraway, Tukwila, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 4 days.

(21) Appl. No.: 17/005,759

(22) Filed: Aug. 28, 2020

(65) Prior Publication Data

US 2022/0070608 A1     Mar. 3, 2022

(51) Int. Cl.
*H04W 4/021*     (2018.01)
*H04W 4/90*      (2018.01)

(52) U.S. Cl.
CPC ............. *H04W 4/021* (2013.01); *H04W 4/90* (2018.02)

(58) Field of Classification Search
CPC ................................ H04W 4/021; H04W 4/90
USPC ....................................................... 455/456.1
See application file for complete search history.

(56) References Cited

U.S. PATENT DOCUMENTS

| | | | |
|---|---|---|---|
| 8,037,151 B1 * | 10/2011 | Daly ................... | H04L 12/1895 709/207 |
| 8,436,728 B2 | 5/2013 | Titus | |
| 8,989,699 B2 | 3/2015 | Hatton | |
| 2007/0139182 A1 | 6/2007 | O'Connor | |
| 2008/0070546 A1 * | 3/2008 | Lee ...................... | H04L 12/1845 455/404.2 |
| 2009/0325538 A1 | 12/2009 | Sennett | |
| 2014/0273911 A1 | 9/2014 | Dunn | |
| 2018/0199179 A1 * | 7/2018 | Rauner ................. | G08B 25/10 |

* cited by examiner

*Primary Examiner* — Ted M Wang
(74) *Attorney, Agent, or Firm* — Loeb & Loeb LLP

(57) ABSTRACT

A computer-implemented method includes receiving, at a mobile device, geographical coordinates defining one or more alert areas associated with a wireless emergency alert over a wireless communication network, and comparing, at the mobile device, the current location of the mobile device with the received coordinates to determine if the mobile device is within the alert area(s). If the mobile device is within the alert area(s), the method further comprises applying a mapping application or other application on the mobile device to construct a map of the alert area(s) based on the coordinates, determine the location of the mobile device with respect the alert area(s), and display the map indicating the location of the mobile device with respect to the alert area(s) at a display interface of the mobile device.

16 Claims, 10 Drawing Sheets

MOBILE DEVICE INTELLIGENT PROCESSING AND PRESENTATION OF WIRELESS EMERGENCY ALERTS

TECHNICAL FIELD

Embodiments discussed herein generally relate to methods and systems for improved processing and presentation of wireless emergency alerts at mobile devices to provide mobile device users with increased information to enhance user safety.

BACKGROUND

The wireless emergency alert system is an alerting system designed to broadcast wireless emergency alerts (WEAs) from an alert originator to wireless devices over wireless communication networks. These alerts may inform the device users of various types of alerts including presidential alerts, alerts involving imminent threats to safety or life (e.g., fires, floods, hurricanes, tornadoes, earthquakes, etc.), public safety alerts, and child abduction (e.g., AMBER) alerts. The alerts may be broadcast to device users according to standards based on requirements set forth by the Federal Communications Commission (FCC). Current WEA 2.0 and WEA 3.0 standards limit the alert text to 360 alphanumeric characters. The device user may be provided an interface to establish settings to enable or disable the presentation of certain types of WEA alerts, and to select a preferred language (e.g., English or Spanish).

The alert originator may choose to define the alert area(s) using geographical coordinates. In WEA 2.0 broadcasts, all mobile devices located within cells or cell sectors that touch or overlap with the alert area(s) present the alert to the device user, even if the mobile device itself is outside of the actual boundaries of the alert area(s). The geographical coordinates defining the alert boundaries are held up in the network in WEA 2.0 and are not communicated to the mobile devices. In networks updated to WEA 3.0, the alert broadcast includes both the alert message and the geographical coordinates defining one or more geometric shapes that describe the boundaries of the alert area(s). Current industry specifications limit the alert area to 10 geometric shapes (circle, polygon) with 1 to 100 total coordinates for all shapes. WEA 3.0 capable mobile devices may apply device-based geo-fencing to tighten the alert presentation to just those mobile devices located within the boundaries of the alert area(s) defined by the alert coordinates, taking into account a 0.1 mile overshoot. WEA 3.0 capable mobile devices are able to receive the coordinates defining the geometric shape of the alert area and compare their location against the alert area(s) to determine whether or not the device is within the alert area(s) and should present the alert. The alert is presented at the mobile device through tactile (vibration cadence), visual (display), and audible (alert tones) means.

While effective, there is a need for providing additional information to mobile device users located near or in an alert area(s) that will assist in avoiding danger and enhancing safety. With various multimedia capabilities, many mobile devices present an opportunity to enhance the information and assistance provided to mobile device users pertaining to wireless emergency alerts. The embodiments of the present disclosure attempt to provide a technical solution to address these needs.

SUMMARY

Embodiments disclosed herein apply to systems and methods for intelligent processing and presentation of wireless emergency alerts at mobile devices whereby the mobile devices apply mobile device features, such as mapping functions, to provide mobile device users with additional safety information over existing systems. In one embodiment, a computer-implemented method of processing and presenting a wireless emergency alert at a mobile device is disclosed. The method may include receiving, at the mobile device, the wireless emergency alert over a wireless communication network. The wireless emergency alert may include an alert message and geographical coordinates defining one or more alert areas associated with the wireless emergency alert. The method may further include comparing, at the mobile device, a current location of the mobile device with the received coordinates to determine if the mobile device is within the alert area(s). If the mobile device is within the alert area(s), the method may further include applying a mapping application on the mobile device to construct a map of the alert area(s) based on the coordinates, and displaying the map indicating the current location of the mobile device with respect to the alert area(s) at a display interface of the mobile device.

In one aspect, the method may also include providing additional assistance, such as instructions for the shortest route to exit or avoid the alert area(s), or the safest route between the current location of the mobile device and a destination indicated by the user. The method may include providing instructions for staying out of the alert area(s) if the mobile device is within a predetermined distance (e.g., 0.1 mile) of an outer boundary of the alert area(s).

In another embodiment, a system for processing and presenting a wireless emergency alert is disclosed. The system may include a wireless communication network, and a mobile device on the wireless communication network. The mobile device may include a processor, a memory, and a communication circuit. The processor may be configured according to computer-executable instructions for receiving, over the wireless communication network, coordinates defining one or more alert areas associated with the wireless emergency alert, wherein the alert area has a geometrical shape independent of a shape of cell sectors of the wireless communication network. The processor may be further configured according to computer-executable instructions for comparing a current location of the mobile device with the received coordinates to determine if the mobile device is within the alert area(s) or within a predetermined distance of the alert area(s) and, if the current location is within the alert area(s) or within a predetermined distance of the alert area(s), applying the coordinates to construct a map of the alert area(s), and displaying the map indicating the current location of the mobile device with respect to the alert area(s).

In one aspect, the processor may be further configured according to computer-executable instructions for providing additional assistance, such as instructions for the shortest route to exit or avoid the alert area(s), or the safest route between the current location of the mobile device and a destination indicated by the user. The processor may be configured according to computer-executable instructions for providing instructions for staying out of the alert area(s) if the mobile device is within the predetermined distance (e.g., 0.1 mile) of the alert areas(s).

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

DETAILED DESCRIPTION

Figure 1:
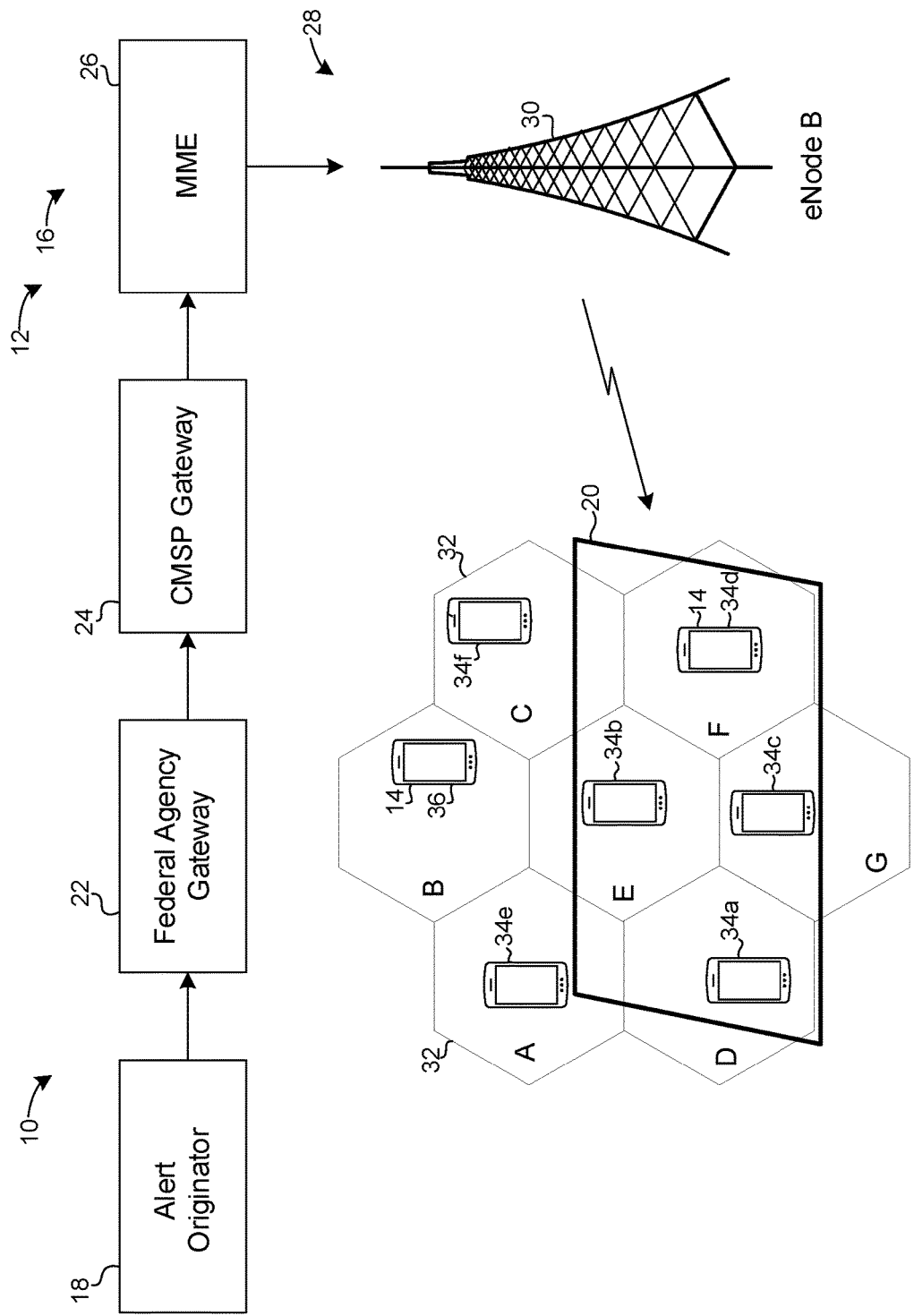
FIG. 1 is a schematic representation of a system for communicating wireless emergency alerts to mobile devices, according to one embodiment.

Referring now to the drawings and with specific reference to FIG. 1, a system 10 for broadcasting a wireless emergency alert (WEA) to mobile devices is shown. More specific details describing intelligent processing and presentation of the WEA at the mobile device level to provide added safety features to the mobile device user, such as mapping features, visuals, and directions to safety, will be provided below.

The system 10 may include a wireless communication network 12, and mobile devices 14 within the wireless communication network 12. The wireless communication network 12 may be a 4G LTE network 16, a 5G network, or another type of wireless network. The mobile devices 14 may include smartphones, tablets, laptops, personal computers, or other wireless devices. The wireless emergency alert may be displayed as a visual (e.g., text) alert at a display interface of the device, or presented as an audible sound or verbal alert, or a tactile alert (vibration). In some arrangements, the alert may be presented at a display interface of a vehicle if the mobile device is connected to or in wireless communication with the vehicle. The mobile devices 14 may be WEA 3.0 capable, meaning that the devices 14 may be capable of both receiving geographical coordinates describing one or more alert areas associated with the wireless emergency alert, and applying device-based geo-fencing to compare their location against the alert area(s) and determine if the alert should be presented at the mobile device 14.

The WEA broadcast may originate from any authorized alert originator 18 such as the National Weather Service (NWS) or United States Geological Survey (USGS), or federal, state, or local agency. The alert may include a presidential alert, an alert regarding imminent threats to safety or life (e.g., fires, wildfires, floods, hurricanes, earthquakes, natural disasters, etc.), child abduction (e.g., AMBER) alerts, and public safety alerts, for example. The broadcast may be a WEA 3.0 broadcast and may include at least the alert message, which may be limited to a specific number of alphanumeric characters (e.g., 360 characters), and geographical coordinates defining one or more geometric shapes (e.g., circle or polygon) describing the geographical boundaries of one or more alert areas 20 associated with the wireless emergency alert. The alert area(s) 20 may be defined as any geometric shape including circular and polygonal shapes. In some embodiments, the geometric shape of the alert area(s) 20 may be limited to 10 geometric shapes with 1 to 100 total coordinates for all shapes, although this limit may vary depending on changing WEA regulations.

The WEA may be sent from the alert originator to the federal agency gateway 22 and to a commercial mobile service provider (CMSP) gateway 24 before entering the carrier's wireless communication network 12. If the wireless communication network 12 is a 4G LTE network 16, it may include, among other components and entities, a mobility management entity (MME) 26, and a radio access network (RAN) 28 including radio base stations (eNodeBs) 30. If the wireless communication network is a 5G network, the nomenclature of the network entities may vary somewhat, as will be understood by those skilled in the art.

The WEA may be broadcast over the air via the radio base stations 30 to the mobile devices 14 in (full) cells 32 or selected cell sectors of cells 32 that touch or overlap with the alert area(s) 20, depending on how the system 10 builds their broadcast area for the wireless emergency alert. In the simplified representation of FIG. 1, the WEA may be broadcast to mobile devices 34 in selected sectors of cells A, C, D, E, F, and G, but not to mobile device 36 in cell B because cell B does not touch or overlap the alert area(s) 20. In other embodiments, the WEA may be broadcast to all mobile devices 34 in (full) cells A, C, D, E, F, and G that touch or overlap with the alert area(s) 20.

Each of the mobile devices 34 in cells A, C, D, E, F, and G (or selected cell sectors of cells A, C, D, E, F, and G) that receive the WEA broadcast may apply device-based geo-fencing to determine whether or not the respective mobile device 34 is within the alert area(s) 20 or within a predetermined distance (e.g., 0.1 mile) of an outer boundary of the alert area(s) 20 according to the geographical coordinates received in the broadcast. More specifically, each mobile device 34 may query its location using location features on the mobile device 34 such as, but not limited to, a global positioning system (GPS), Bluetooth beacons, and triangulation features. If the mobile device 34 is within the alert area(s) 20 or within a predetermined distance of the alert area(s) 20, the mobile device 34 may present the alert, as explained more specifically below. In the exemplary representation of FIG. 1, mobile devices 34a-34d would present the alert because they are located within the boundaries of the alert area(s) 20, whereas mobile devices 34e and 34f would not present the alert because they are located outside of the boundaries of the alert area(s) 20. In other arrangements, the mobile devices 34 in cells or in selected cell sectors of cells A, C, D, E, F, and G overlapping the alert area(s) 20 may default to presenting the wireless emergency alert even if the mobile devices 34 is outside of the alert area(s) 20, such as when device based geo-fencing is bypassed to accelerate the dissemination of the alert, or when the location features on the mobile device 34 are turned off or functioning poorly.

Figure 2:
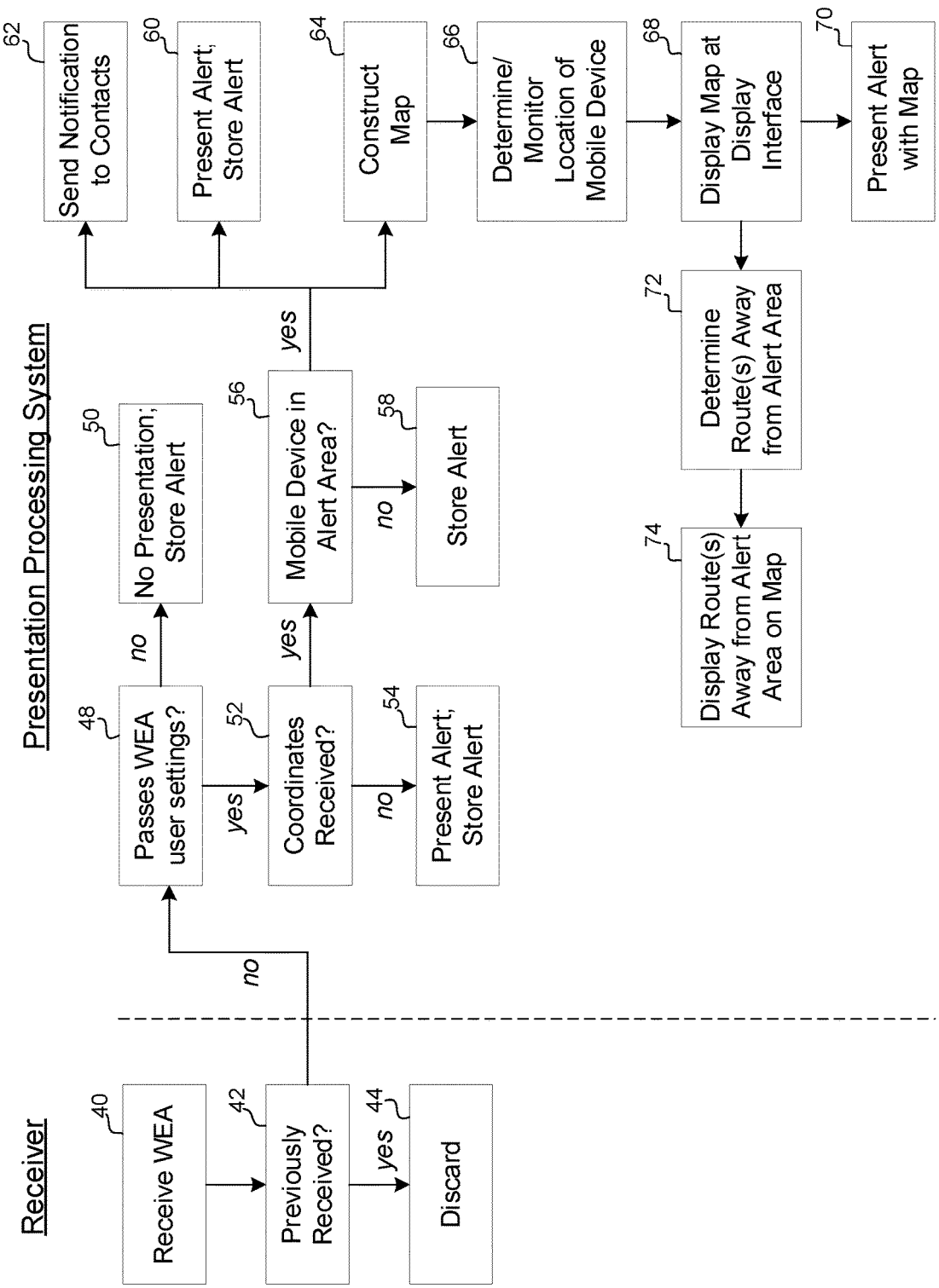
FIG. 2 is a flow chart illustrating an exemplary computer-implemented method for processing and presenting a wireless emergency alert at a mobile device, according to one embodiment.

Turning now to FIG. 2, an exemplary method for processing and presenting the WEA at a mobile device 14 is shown. Beginning at a block 40, a receiver of the mobile device 14 may receive the WEA broadcast over the wireless communication network 12. The WEA broadcast may at least include the alert message (e.g., an alert text of alphanumeric characters) and the geographical coordinates defining the alert area(s) 20 associated with the WEA. At a block 42, the mobile device 14 may determine whether the WEA broadcast was previously received. If so, the WEA and the geographical coordinates may be discarded at a block 44 to avoid duplicate messages. If the WEA broadcast was not previously received, the WEA may be passed to a presentation processing system 46 of the device 14 (also see FIG. 3).

At a block 48, the presentation processing system 46 may determine whether the broadcast complies with WEA user setting checks. For example, the mobile device user may have disabled or opted out of certain types of alerts. If the broadcast does not pass the user setting checks, then the alert will not be presented and will be stored for recall by the user if desired (block 50). If the WEA broadcast passes the user setting checks, the presentation processing system 46 may determine if geographical coordinates were received in the broadcast (block 52). If the coordinates were not received in the broadcast, the system 46 may default to presenting the alert and storing the alert according to a block 54. If the coordinates were received, the system 46 may apply the coordinates to internally construct the alert area(s) 20, and compare the current location of the mobile device with the received coordinates to determine if the mobile device is within the alert area(s) 20 or within a predetermined distance (e.g., 0.1 miles) of the alert area 20 (block 56). If not within or near (within a predetermined distance of) the alert area(s) 20, the alert is stored and not presented (block 58). If the mobile device 14 is within the alert area(s) 20 or within the predetermined distance of the alert area(s) 20, the wireless emergency alert may be presented and stored on the mobile device 14 (block 60). The alert may be presented as a visual/text alert at the display interface, an audible sound alert, an audible verbal alert, or a tactile (vibration) alert. In other situations where the mobile device location cannot be determined, the system 46 may default to presenting the alert. Additionally, in some embodiments, the mobile device 14 may send a notification over the wireless communication network 12 to devices of user-selected contacts to notify the contacts that the mobile device user is in an alert area and may be in danger (block 62).

When the coordinates are received, the mobile device 14 may apply a mapping application or other mapping functions on the mobile device 14 to construct a map of the alert area(s) 20 based on the coordinates (block 64), and determine or monitor the location of the mobile device 14 with respect to the alert area(s) 20 on the map (block 66). The map may then be displayed at the display interface to show the alert area(s) 20 as well as the location of the mobile device 14 with respect to the alert area(s) 20 (block 68). In some embodiments, the location of the mobile device 14 with respect to the alert area 20 may be updated periodically or in real-time as the mobile device 14 and/or the alert area 20 change locations.

According to a block 70, the alert may be presented along with the map at the display interface as a visual/text alert, an audible sound alert, an audible verbal alert, or a tactile alert (e.g., vibration alert). Alternatively, the alert may be presented separately from the map, and the mobile device user may have a selection to view the map when the alert is presented.

The mobile device 14 may further apply the mapping application or other mapping functions available on the mobile device 14 to determine one or more routes for the mobile device user to get away from the alert area(s) 20 and out of danger in a safe and/or quick manner (block 72), or to reach a particular destination using a route which avoids the active alert area(s). The one or more routes may be displayed on the map, such as with arrows providing directions for the user to get to safety (block 74). Alternatively, or in addition to this, the routes may be displayed at the display interface as a text description along with or separately from the map, and/or may be provided as an audible verbal description to assist the user in getting to safety without having to read the display interface, such as when driving, and assisting in what may be a time of panic. In some embodiments, the presentation processing system 46 may choose the safest and/or shortest route(s) to present at the mobile device 14. In other embodiments, the system 46 may rank the routes according to safety and/or quickness, and the mobile device user may select the safest and/or fastest route according to their preference. It will be understood that the steps of FIG. 2 are exemplary and may include fewer or additional steps, may be performed in a different order, or may be implemented in other ways by the device elements in practice.

Figure 3:
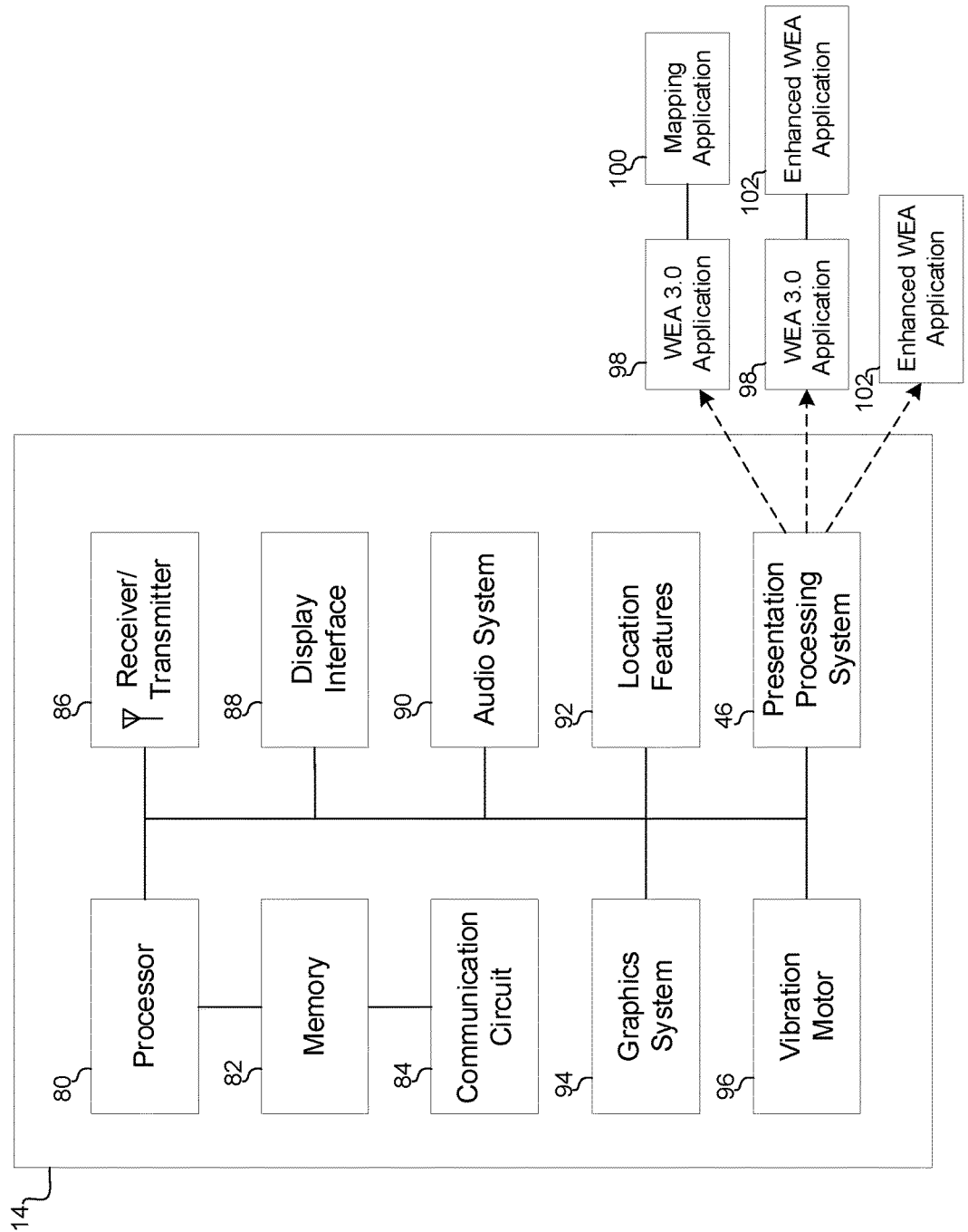
FIG. 3 is a schematic representation of certain components of an exemplary mobile device, according to one embodiment.

Certain components of the mobile device 14 involved in processing and presenting the WEA are shown in FIG. 3. The mobile device 14 may include a processor 80 configured according to computer-executable instructions for receiving, intelligently processing, and presenting the WEA as described above. A memory 82 may be configured to store data and assist the processor 80, and a communication circuit 84 may be involved in receiving and transmitting broadcasts or data over the wireless communication network 12 and over other communication networks such as the Internet. The processor 80 may be in communication with a receiver/transmitter 86 involved in receiving the WEA broadcast and converting wireless signals into digital data and vice versa. Additionally, the processor 80 may be in communication with a display interface 88 for presenting the alerts as text or visual messages, and an audio system 90 including a speaker for presenting alerts as audible sounds and audible verbal messages. Location features 92 on the mobile device 14 may assist with constructing the maps and determining the current location of the device 14 with respect to the alert area 20. The location features 92 may include features such as, but not limited to, a global positioning system (GPS), triangulation features, inertial sensors, and Bluetooth beacon location features. A graphics system 94 may be involved in providing graphics at the display interface 88, such as maps and other visuals pertaining to the WEA, and may include a graphics processing unit (GPU). Additionally, a vibration motor 96 may be involved in providing the tactile (vibration) alerts.

The presentation processing system 46 may be involved in processing and presenting the WEA and may be in communication with the aforementioned components including the receiver/transmitter 86, the display interface 88, the audio system 90, the location features 92, the graphics system 94, and the vibration motor 96. More particularly, the presentation processing system 46 may be involved in determining whether the mobile device 14 is in the alert area 20, presenting the alert, constructing and presenting the map, and determining and presenting routes to safety as described above in relation to FIG. 2.

In some embodiments, the presentation processing system 46 may include a basic WEA 3.0 application 98 that processes the alert broadcast, and applies device based geo-fencing to determine whether the mobile device 14 should present the alert. The WEA 3.0 application 98 may interface with a pre-existing mapping application 100 on the mobile device 14 which constructs the map, displays the map, and determines and provides the routes to safety. In other embodiments, the WEA 3.0 application 98 may interface with an enhanced WEA 3.0 application 102 which provides the mapping features and routes to safety. In yet other embodiments, the enhanced WEA 3.0 application 102 may be a single application that combines the functions of the basic WEA 3.0 application and a mapping application.

Figure 4:
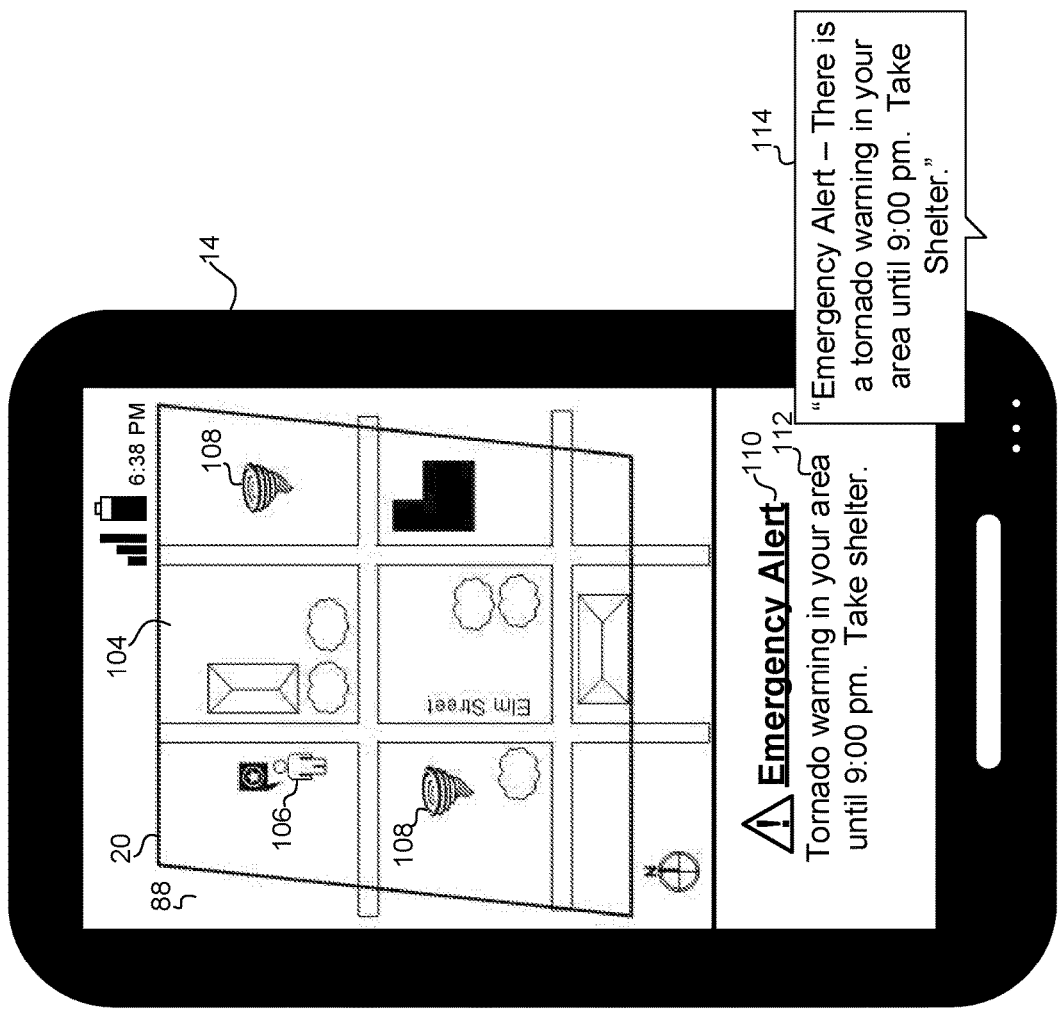
FIG. 4 is an exemplary display interface of the mobile device including a map indicating a location of the mobile device with respect to an alert area associated with the wireless emergency alert, according to one embodiment.

FIG. 4 shows an exemplary map 104 as provided at the display interface 88 of the mobile device 14. As shown, the map 104 may indicate the alert area 20 with respect to surrounding geographical areas, as well as a location 106 of the mobile device 14 with respect to the alert area 20. The alert area 20 may be colored differently, highlighted, or otherwise distinguished from the surrounding areas on the map 104. The map 104 may also include symbols 108 corresponding to the type of alert, such as tornado, hurricane, or fire symbols, for quick reference by the user. In some embodiments, the location of the symbols 108 may correlate with actual locations of the hazards, if such locations are received in the WEA broadcast or are known by the device. In some embodiments, the location of the symbols 108 on the map 104 may be updated periodically or in real-time to allow the mobile device user to track the their location with respect to the hazard, such as a tornado, as it changes position. An alert 110 associated with the alert area(s) 20 may be presented along with the map 104 as a text alert 112, an audible verbal alert 114, an audible sound alert, and/or a tactile alert.

Figure 5:
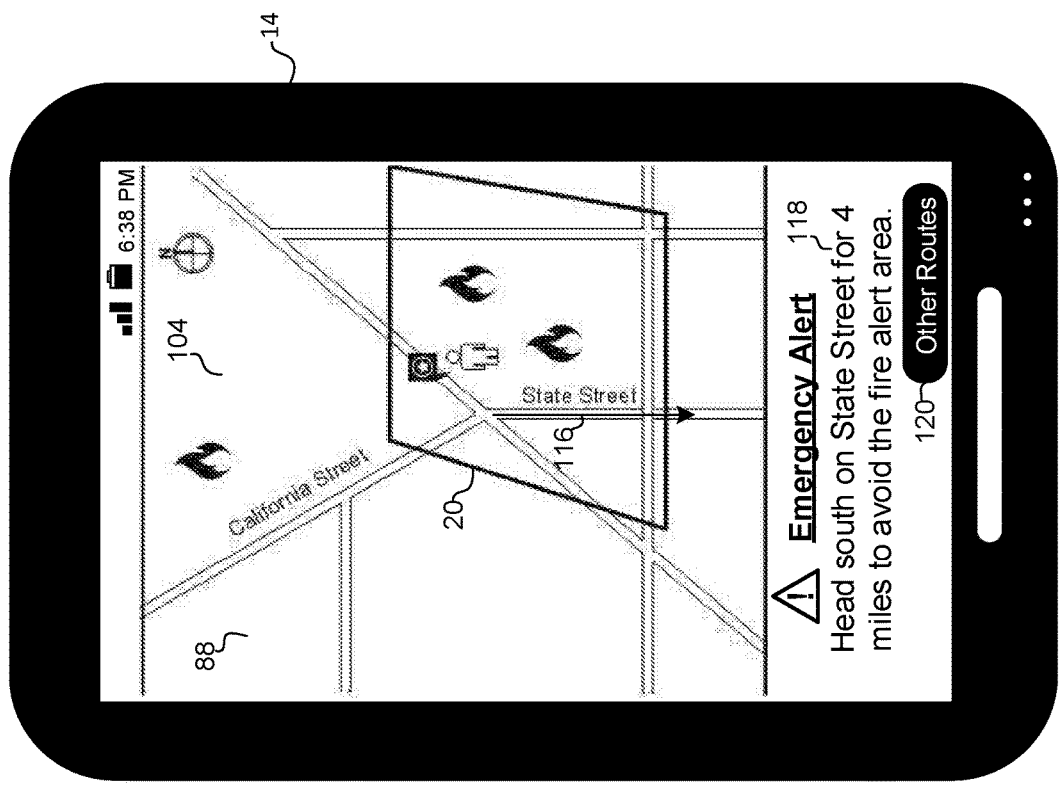
FIG. 5 is an exemplary display interface of the mobile device similar to FIG. 4 including a route away from the alert area on the map, according to one embodiment.
Figure 6:
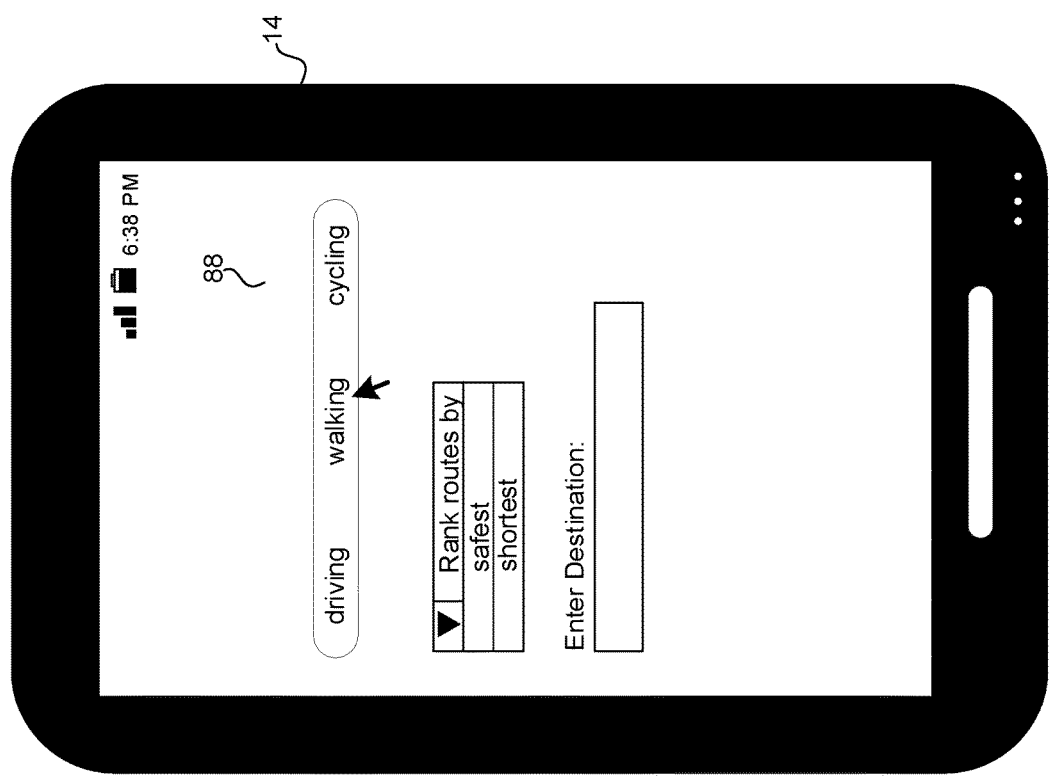
FIG. 6 is an exemplary display interface of the mobile device allowing user customization of the display of routes to safety, according to one embodiment.

One or more routes 116 to guide the mobile device user to safety may be shown on the map 104, as shown in FIG. 5. The route(s) 116 may be displayed as arrows indicating directions for the mobile device user to follow to get out of the alert area 20. Additionally, or alternatively, the route(s) 116 may be provided as a text description 118 or as an audible verbal description. In some embodiments, the route(s) 116 may direct the mobile device user to a selected destination in a safe and/or quick manner that avoids the alert area(s) 20. In yet other embodiments, the route(s) 116 may provide instructions for staying out of the alert area(s) if the mobile device is within a predetermined distance (e.g., 0.1 mile) of an outer boundary of the alert area(s). The mobile device user may have a selection 120 at the display interface 88 to view alternative routes. The mobile device user may customize the presentation of the routes via the display interface 88, as shown in FIG. 6. For example, the user may select the transportation method (e.g., driving, walking, cycling, etc.), a preference for displaying or ranking the routes that are displayed (e.g., safest, shortest, etc.), and a destination, if desired.

Figure 7:
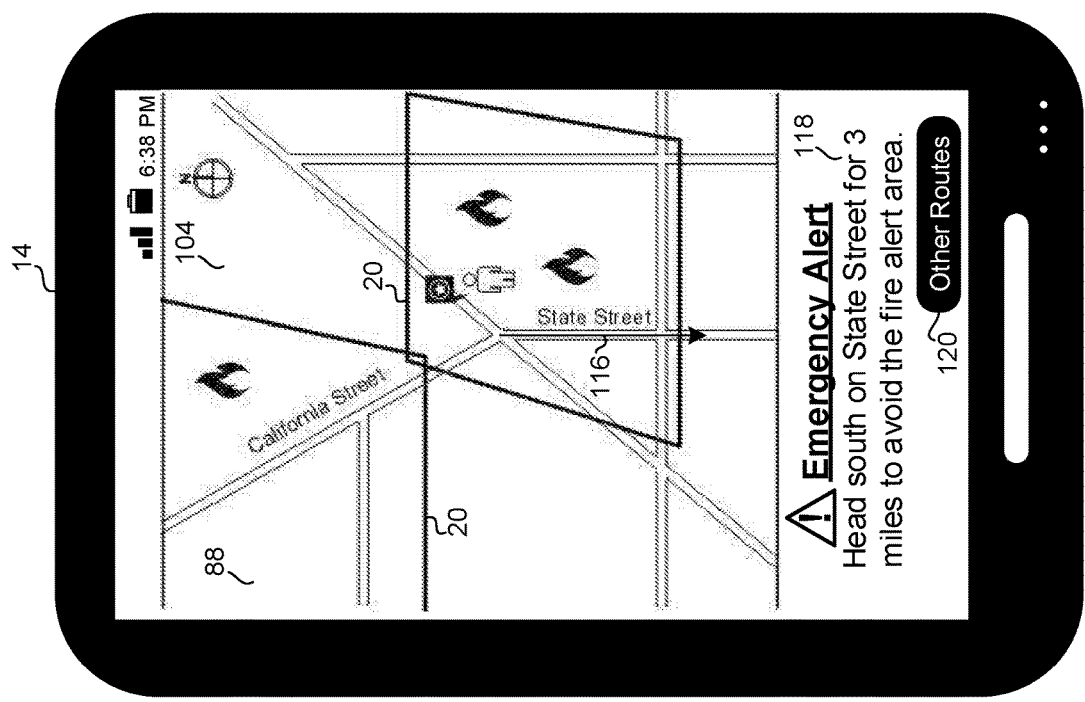
FIG. 7 is an exemplary display interface of the mobile device similar to FIG. 5 and including a route away from multiple alert areas on the map, according to one embodiment.

In some circumstances, the WEA broadcast may include multiple shapes (e.g., circles, polygons, etc.) defining different alert areas which may or may not overlap and may complicate the mobile device user's path to safety. In these situations, the presentation processing system 46 may apply the coordinates of the different alert areas to construct a map 104 of the multiple alert areas 20 to show the mobile device user that traveling in certain directions may get the user out of one alert area but into another (see FIG. 7). The different alert areas 20 may be associated with the same type of alert, or different types of alerts. If certain alert areas 20 are overlapping, the presentation processing system 46 may combine the overlapping alert areas into a larger alert area on the map. For example, with reference to FIG. 7, the two alert areas 20 are shown as overlapping separate alert areas, but may also be displayed as a single, combined alert area. When viewing the map 104, the mobile device user may see that traveling Northwest on California Street may bring him or her out of one of the alert areas 20 but into another. The presentation processing system 46 may display one or more routes 116 at the display interface 88 to guide the user away from all of the alert areas 20 and into safety. A text description 118 of the route(s) 116 may also be provided at the display interface 88. Additionally, or alternatively, an audible verbal description of the route(s) may be provided.

Figure 8:
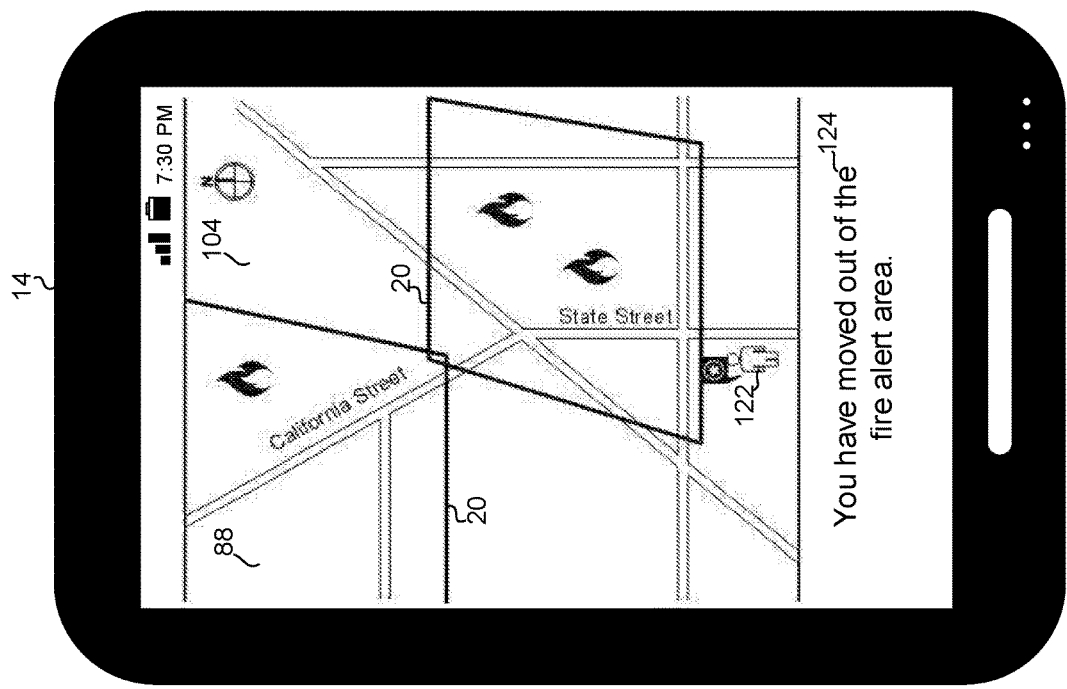
FIG. 8 is an exemplary display interface of the mobile device similar to FIG. 7 including an indication that the mobile device has moved away from the alert areas, according to one embodiment.

Referring to FIG. 8, the presentation processing system 46 may apply the location features 92 and the mapping functionality of the mobile device 14 to track the mobile device user's position, and provide an indication 122 on the map 104 when the mobile device user has moved out of the alert area(s) 20, is moving away from the alert area(s) 20, or is approaching the alert area(s) 20. The indication 122 may also be provided as a text indication 124, an audible verbal indication, or other sound or tactile indication. In some embodiments, the position of the mobile device user with respect to the alert area(s) 20 may be tracked and displayed on the map 104 in real time. Text, audio, or tactile indications indicating whether the user is moving away from or approaching the alert area(s) 20 may also be provided in real time.

Figure 9:
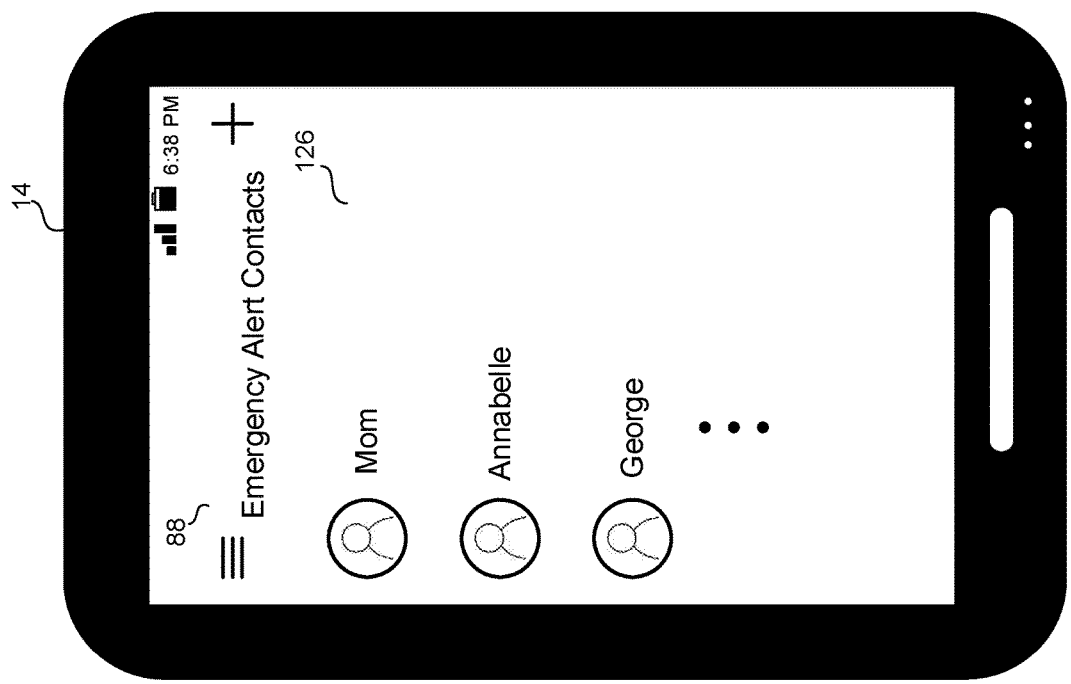
FIG. 9 is an exemplary display interface of the mobile device illustrating an emergency alert contact list, according to one embodiment.
Figure 10:
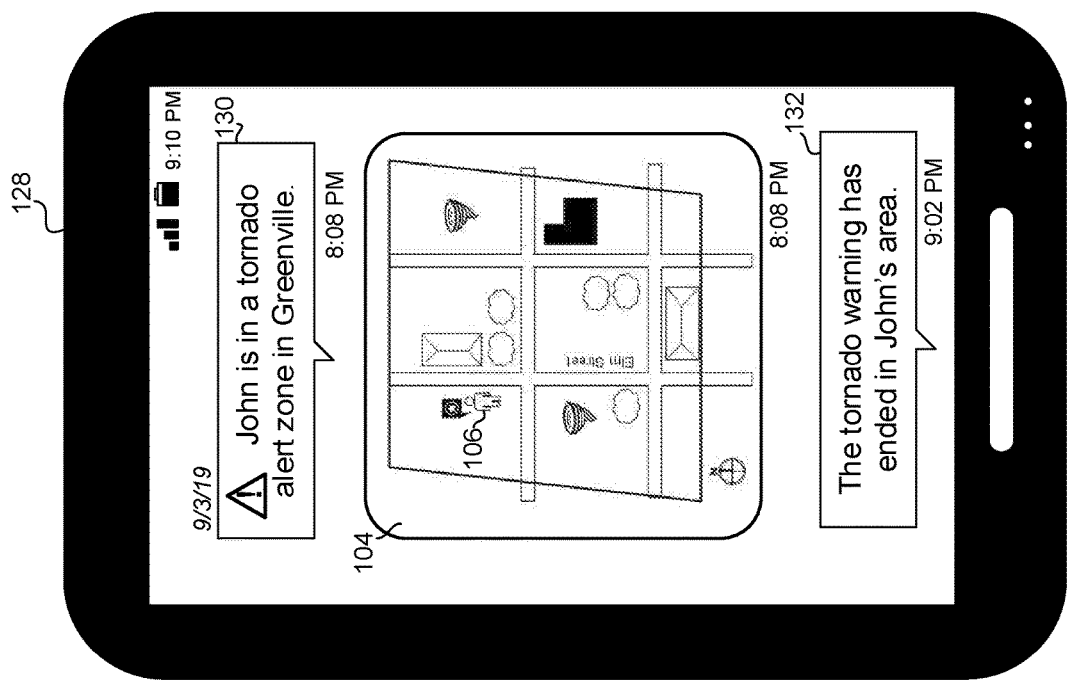
FIG. 10 is an exemplary display interface at another mobile device providing a notification that a contact is in an alert area, according to one embodiment.

The mobile device user may create an emergency contact list 126 via the display interface 88 of the mobile device 14, specifying contacts such as friends or family members the user would like to notify when the user is within or near an alert area. An exemplary emergency contact list 126 is shown in FIG. 9. An exemplary notification sent to a mobile device 128 of a contact is shown in FIG. 10. The notification may be sent to the specified contacts as a text message 130. In some embodiments, the map 104 showing the location 106 of the mobile device user with respect to the alert area 20 may be sent with the text message 130 or as a separate text message. In some embodiments, text and/or map updates indicating any changes in the mobile device user's location may be sent to the selected contacts periodically. A notification, such as a text message 132, may also be sent to the contacts when the mobile device user has reached safety or when the alert has come to an end.

The present disclosure provides an enhancement in current WEA 3.0 mobile device capabilities to provide additional information to mobile device users and increase user safety. Prior to WEA 3.0, the geographical coordinates of the alert area were held in the network and were not communicated to the mobile device. With the geographical coordinates being communicated to capable mobile devices in WEA 3.0 as of the end of 2019, the mobile devices apply device-based geo-fencing to refine the presentation of alerts to just those mobile devices within the alert boundaries, or within a predetermined distance of the alert boundaries. The present disclosure extends the alert information provided by WEA 3.0 capable mobile devices by interfacing with mapping functions or other applications on the mobile device to construct a map of the alert area(s) based on the received coordinates. The map may provide visuals indicating the location of the mobile device with respect to the alert area(s), and routes for getting away from the alert area(s) and to safety, either simply exiting the alert area(s) or moving toward a specified destination. Alerts and directions to safety may be provided as audible voice descriptions to assist the user in a hands-free manner, such as when the user is driving or in a hurry to get to safety. Furthermore, the location and mapping features on the mobile device may track the position of the mobile device with respect to the alert area(s) and provide visual or audible indications of when the user is approaching or moving away from the alert area(s). Thus, the present disclosure provides an improvement in WEA 3.0 technology at the mobile device level by enhancing mobile device intelligent processing and presentation of wireless emergency alerts to provide additional safety information to the mobile device user.

What is claimed is:

1. A computer-implemented method of processing and presenting a wireless emergency alert at a mobile device, comprising:
   receiving, at the mobile device, the wireless emergency alert over a wireless communication network, the wireless emergency alert including an alert message and geographical coordinates defining one or more alert areas associated with the wireless emergency alert;
   comparing, at the mobile device, a current location of the mobile device with the received coordinates to determine if the mobile device is within the alert area(s); and
   if the mobile device is within the alert area(s), applying a mapping application on the mobile device to:
      construct a map of the alert area(s) based on the coordinates,
      display the map indicating the current location of the mobile device with respect to the alert area(s) at a display interface of the mobile device,
      determine one or more routes away from the alert area(s), and
      display the one or more routes away from the alert area(s) on the map.

2. The computer-implemented method of claim 1, wherein if the mobile device is within the alert area(s), the method further comprises displaying the alert message with the map at the display interface.

3. The computer-implemented method of claim 1, further comprising providing, at the mobile device, a text description or an audible verbal description of the one or more routes away from the alert area(s).

4. The computer-implemented method of claim 1, wherein if the mobile device is within the alert area(s), the method further comprises presenting the alert message at the mobile device as a text alert, an audible verbal alert, a sound alert, and a tactile alert.

5. The computer-implemented method of claim 1, wherein if the mobile device is within the alert area(s), the method further comprises applying the mapping application to monitor changes in a current location of the mobile device with respect to the alert area(s) in real time, and to provide an indication at the display interface of whether the mobile device is approaching or moving away from the alert area(s) based on the changes in the current location.

6. The computer-implemented method of claim 5, wherein the indication is provided as a visual indication on the map.

7. The computer-implemented method of claim 5, wherein the indication is provided as a text indication, and as an audible, verbal indication.

8. The computer-implemented method of claim 1, wherein if the mobile device is within the alert area(s), the method further comprises communicating a notification over the wireless communication network to one or more contacts in an emergency alert contact list of the mobile device, the notification indicating that the mobile device is within the alert area(s).

9. The computer-implemented method of claim 1, wherein the wireless communication network is a 4G long-term evolution (LTE) communication network or a 5G communication network.

10. A system for processing and presenting a wireless emergency alert, comprising:
    a wireless communication network; and
    a mobile device on the wireless communication network, the mobile device including a processor, a memory, and a communication circuit, the processor being configured according to computer-executable instructions for:
       receiving, over the wireless communication network, coordinates defining one or more alert areas associated with the wireless emergency alert, the alert area(s) having a geometrical shape independent of a shape of cell sectors of the wireless communication network,
       comparing a current location of the mobile device with the received coordinates to determine if the mobile device is within the alert area(s) or within a predetermined distance of an outer boundary of the alert area(s), and
       if the current location is within the alert area(s) or within the predetermined distance of the outer boundary of the alert area(s):
          applying the coordinates to construct a map of the alert area(s),
          displaying the map indicating the current location of the mobile device with respect to the alert area(s),
          determining one or more routes away from the alert area(s), and
          displaying the one or more routes away from the alert area(s) on the map.

11. The system of claim 10, wherein the processor is further configured according to computer-executable instructions for displaying an alert message with the map at the display interface if the current location is within the alert area(s) or within a predetermined boundary of the alert area(s).

12. The system of claim 11, wherein the alert message is displayed as a text alert and an audible verbal alert.

13. The system of claim 10, wherein the processor is further configured according to computer-executable instructions for providing a text description of the one or more routes away from the alert area(s) on the map.

14. The system of claim 10, wherein the processor is further configured according to computer-executable instructions for providing an audible verbal description of the one or more routes away from the alert area(s).

15. The system of claim 10, wherein the mobile device includes a first application that receives the coordinates defining the alert area(s) associated with the wireless emergency alert and compares the current location of the mobile device with the received coordinates to determine if the mobile device is within the alert area(s) or within the predetermined distance of the outer boundary of the alert area(s), wherein the mobile device further includes a mapping application that applies the coordinates to construct a map of the alert area(s) and displays the map indicating the current location of the mobile device with respect to the alert area(s), and wherein the first application interfaces with the mapping application.

16. The system of claim 10, wherein the predetermined distance is 0.1 miles.

\* \* \* \* \*